(12) United States Patent
Iwasaki et al.

(10) Patent No.: US 10,298,748 B2
(45) Date of Patent: May 21, 2019

(54) CABLE PAIR STABILIZER UNIT AND METHOD AND SYSTEM FOR GENERATING SEALING CURRENT

(71) Applicant: Enginuity Communications Corp., St. Charles, IL (US)

(72) Inventors: Sean Iwasaki, Chicago, IL (US); Stephen M. Todd, Geneva, IL (US)

(73) Assignee: Enginuity Communications Corp., St. Charles, IL (US)

( * ) Notice: Subject to any disclaimer, the term of this patent is extended or adjusted under 35 U.S.C. 154(b) by 367 days.

(21) Appl. No.: 14/959,260

(22) Filed: Dec. 4, 2015

(65) Prior Publication Data
US 2016/0198038 A1 Jul. 7, 2016

Related U.S. Application Data

(60) Provisional application No. 62/089,224, filed on Dec. 8, 2014.

(51) Int. Cl.
| | |
|---|---|
| *H04M 1/74* | (2006.01) |
| *H04M 11/06* | (2006.01) |
| *H04M 3/18* | (2006.01) |
| *H04M 19/00* | (2006.01) |

(52) U.S. Cl.
CPC ............ *H04M 1/745* (2013.01); *H04M 3/18* (2013.01); *H04M 11/062* (2013.01); *H04M 19/001* (2013.01)

(58) Field of Classification Search
CPC .................................................. H04M 1/745
USPC ........... 363/50; 370/463, 257, 352; 375/257; 379/1.03, 9.02, 377, 399.1, 412, 413, 379/27.01, 414, 24, 399.02; 323/316
See application file for complete search history.

(56) References Cited

U.S. PATENT DOCUMENTS

| | | | | |
|---|---|---|---|---|
| 4,716,358 A | * | 12/1987 | Fucito | ..................... G05F 1/561 323/316 |
| 4,984,250 A | * | 1/1991 | Koyama | .................. H04B 3/02 178/69 R |

(Continued)

OTHER PUBLICATIONS

Int'l Search Report and Written Opinion of the Int'l Searching Authority for Applicant's corresponding PCT application PCT/US2015/063988, dated Feb. 2, 2016, 10 pages.

*Primary Examiner* — Gerald Gauthier
(74) *Attorney, Agent, or Firm* — Charles T. Riggs, Jr.

(57) ABSTRACT

The present subject matter relates to one or more devices, systems and/or methods for generating sealing current at a customer's premises or residence and injecting the sealing current into a DSL service provider's telephone cables to prevent the oxidation or corrosion of wire splices or connections on the telephone cables transporting DSL services. A cable pair stabilizer unit is connected at the customer's premises or residence, between the service provider's telephone cables and the customer's residential gateway/modem. The cable pair stabilizer unit comprises circuitry for generating the sealing current and for injecting the sealing current into the service provider's telephone cables transporting DSL services. The cable pair stabilizer unit may be combined with an AC/DC power supply adapter as a single, integrated device. The cable pair stabilizer unit may alternatively be combined with or inside of the Residential Gateway as a single, integrated device.

23 Claims, 21 Drawing Sheets

(56) References Cited

U.S. PATENT DOCUMENTS

| | | | | |
|---|---|---|---|---|
| 5,131,033 | A * | 7/1992 | Reum | H04M 19/005 379/324 |
| 5,442,697 | A * | 8/1995 | McGary | H04B 3/46 370/248 |
| 5,621,731 | A * | 4/1997 | Dale | H04M 3/42314 370/257 |
| 6,510,152 | B1 * | 1/2003 | Gerszberg | H04M 1/2478 348/E7.078 |
| 6,532,277 | B2 * | 3/2003 | Ulanskas | H04B 3/32 379/1.03 |
| 6,560,129 | B1 * | 5/2003 | Walger | H04Q 11/0435 363/50 |
| 7,027,587 | B2 | 4/2006 | Menesco, Jr. | |
| 7,773,744 | B1 * | 8/2010 | Joffe | H04M 1/738 379/29.04 |
| 7,787,614 | B2 | 8/2010 | Duran et al. | |
| 8,270,572 | B2 * | 9/2012 | Buskmiller | H04M 3/08 379/12 |
| 8,275,094 | B2 * | 9/2012 | Li | H04M 19/001 379/1.03 |
| 2002/0021787 | A1 | 2/2002 | Chen | |
| 2004/0161100 | A1 * | 8/2004 | Menasco, Jr. | H04M 19/001 379/377 |
| 2006/0072606 | A1 * | 4/2006 | Posthuma | H04L 25/0298 370/463 |
| 2006/0233352 | A1 * | 10/2006 | Ploumen | H04L 29/06027 379/399.01 |
| 2007/0116257 | A1 * | 5/2007 | Duran | G02B 6/4475 379/413 |
| 2007/0116260 | A1 * | 5/2007 | Sodersjerna | H04M 1/76 379/414 |
| 2007/0147591 | A1 * | 6/2007 | Ploumen | H04M 3/305 379/1.03 |
| 2007/0263778 | A1 * | 11/2007 | Aydin | H04M 3/08 379/9.02 |
| 2008/0056224 | A1 | 3/2008 | Hoiness et al. | |
| 2008/0205631 | A1 * | 8/2008 | Francheschini | H04M 11/062 379/377 |
| 2016/0198038 | A1 * | 7/2016 | Iwasaki | H04M 1/745 379/412 |

* cited by examiner

Figure 11B
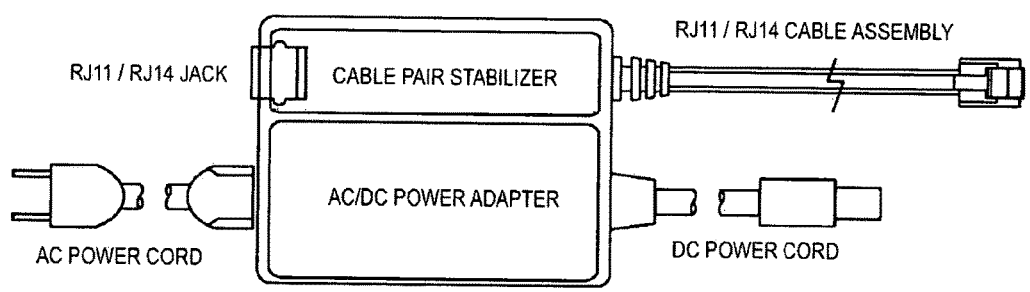
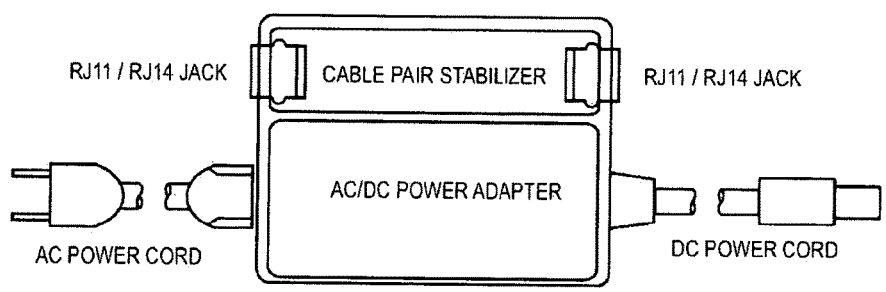
Figure 11C

Current Zap Waveform

Current Pulse Waveform

CABLE PAIR STABILIZER UNIT AND METHOD AND SYSTEM FOR GENERATING SEALING CURRENT

TECHNICAL FIELD

The exemplary teachings herein pertain to methods and systems for generating sealing current to condition telephone cables, and in particular, to methods and systems which generate and send current into a Service Provider's telephone lines for DSL only or other dry or non-powered broadband service. Specifically, the present disclosure relates to methods and systems, comprising electrical circuitry including a current generator and a current injector, for providing current into the Service Provider's telephone cables to prevent the oxidation or corrosion of wire splices or connections on the telephone cables transporting DSL services, to provide more reliable DSL service.

BACKGROUND

For typical DSL service involving one or two wire pairs, the Service Provider would combine POTS (plain old telephone service) and DSL for service deployment. POTS would provide the voice service and the DSL would provide the data and video content. The POTS and DSL services are typically deployed from different telecommunication equipment and locations. POTS is typically deployed from a Central Office facility located up to 18 kft away from the customer. DSL is typically deployed from an outside plant (OSP) equipment cabinet located 1-3 kft from the customer. The POTS and DSL are combined at the customer's facility or the DSL OSP equipment cabinet. See FIG. 1, Prior Art. With transportation costs responsible for up to 10% of a product's price point, many organizations are looking to logistics for growth. Making strategic advances not just in how the organization goes to market, but in how the organization gets to market can enhance customer service, decrease order-to-cash cycle times, reduce payment lead times, minimize taxes, and ultimately increase working capital. In fact, time compression and information accuracy within the transportation function can significantly re-shape the balance sheet.

POTS inherently provides current to power the customer's phone and to determine if the customer was ready to make a telephone call or hang up. This current also provided the additional benefit of maintaining the wire continuity connections (i.e. preventing oxidation) at wire splices or IDC wire connections between the Service Providers facility and the Customer Premise's or residence. The current prevents corrosion from occurring at these wire splices or IDC wire connections, which can be numerous. If any of the wire splices or IDC wire connections oxidizes, the telephone wire loses its ability to reliably transport DSL services. To support their tactical and operational decisions, organizations traditionally use two distinct systems: one to address tactical-planning issues, and one to address operational-planning issues. However, the use of two distinct systems for tactical and operations decisions presents numerous inefficiencies, limitations and disadvantages, due to a lack of or limited interaction between the two systems. It is desirable that the two systems interact with each other, since tactical decisions are necessary for, and place constraints on, operational planning decisions. Furthermore, tactical decisions establish defined resource requirements for operational decisions.

Currently, the customers are abandoning their POT'S for their cell phones. The POTS is either disconnected or not initially deployed, such as with a DSL only service deployment. In either situation, the POTS current is no longer provided. When DSL service trouble calls increased, the Service Provider's identified the problem as oxidation or corrosion at telephone cable wire splices or IDC wire connections. The solution to correct and prevent oxidation or corrosion was to subject the wire splices or IDC wire connections to low DC current (i.e. sealing or wetting current). Attempts have been made to install sealing current equipment at the same location as the DSL equipment or to have the DSL equipment incorporate sealing current functionality. Both attempts were unsuccessful due to space, costs, power consumed, and thermal capabilities, more specifically as follows:

Space: DSL equipment is installed in an outdoor cabinet (called VRAD, Video-Ready Access Device), wherein the VRAD cabinet does not have space to effectively support sealing current generators and injectors.

Cost: The additional cost to provide sealing current generators and injectors on all DSL service would be relatively high.

Power Consumed: The VRAD cabinet's power source may not have the ability to generate sealing current for all DSL services.

Thermal: The VRAD cabinet was designed to support the heat generated from the DSL equipment and other accessories. The added heat from sealing current generators could not adequately be supported.

The following prior art references relate to and/or discuss one or more of the above described issues, and are each herein fully incorporated by reference:

U.S. Pat. No. 5,131,033 entitled Sealing Current Generator for a Telephone Circuit, issued to Reum on Jul. 14, 1992.

U.S. Pat. No. 7,027,587 B2 entitled System and Method for Deriving Sealing Current, issued to Menasco, Jr. on Apr. 11, 2006.

U.S. Pat. No. 7,773,744 B1 entitled System and Method for Terminating Sealing Current, issued to Joffe on Aug. 10, 2010.

U.S. Pat. No. 7,787,614 B2 entitled Sealing Current Terminator for Inhibiting Oxidation and Methods Therefore, issued to Duran et al. on Aug. 31, 2010.

SUMMARY

A cable pair stabilizer unit generates and injects or sends sealing or wetting current into the Service Provider's telephone cables for DSL (digital subscriber line) service from the customer's premise or residence. The cable pair stabilizer unit utilizes or taps the customer's DSL residential gateway (i.e. modem) power supply adapter to generate the sealing current. By doing so, the cable pair stabilizer unit maintains the telephone cable wire splice continuity from the Service Provider's facility to the Customer Premise's or Residence. This prevents the oxidation or corrosion of wire splices or connections on the telephone cables transporting DSL services, which would otherwise cause errors or loss of service on the DSL service. As a result, the DSL service, which is transported or carried by the telephone cables, is more reliable.

Accordingly, the ability of the cable pair stabilizer unit to generate and send scaling current at the customer's premises addresses the Service Provider's power and space limitation of sending the sealing current within their facilities, and overcomes the problems, disadvantages and limitations of there being high costs, limited space, limited power, and thermal challenges to generate sealing current from within the Service Provider's facility, namely the outside plant (OSP) equipment cabinet.

Additional advantages and novel features will be set forth in part in the description which follows, and in part will become apparent to those skilled in the art upon examination of the following and the accompanying drawings or may be learned by production or operation of the examples.

BRIEF DESCRIPTION OF THE DRAWINGS

The drawing figures depict one or more implementations in accord with the present teachings, by way of example only, not by way of limitation. In the drawing figures, like reference numerals refer to the same or similar elements.

FIG. 11B is a schematic view of an alternate embodiment of the present disclosure illustrating an integrated cable pair stabilizer unit and AC/DC power supply adapter, with an integrated RJ11/RJ14 cable assembly.

FIG. 11C is a schematic view of an alternate embodiment of the present disclosure illustrating an integrated cable pair stabilizer unit and AC/DC power supply adapter, with an RJ11/RJ jack.

FIG. 13C is a schematic view of the alternate embodiment sealing current generator waveform of the PTC device of FIG. 13A.

DETAILED DESCRIPTION

The following description refers to numerous specific details which are set forth by way of examples to provide a thorough understanding of the relevant method(s) and system(s) disclosed herein. It should be apparent to those skilled in the art that the present disclosure may be practiced without such details. In other instances, well known methods, procedures, components, hardware and/or circuitry have been described at a relatively high-level, without detail, in order to avoid unnecessarily obscuring aspects of the present disclosure. While the description refers by way of example to methods and systems for transport management, it should be understood that the method(s) and system(s) described herein may be used in any situation where logistics is needed or desired.

Figure 1:
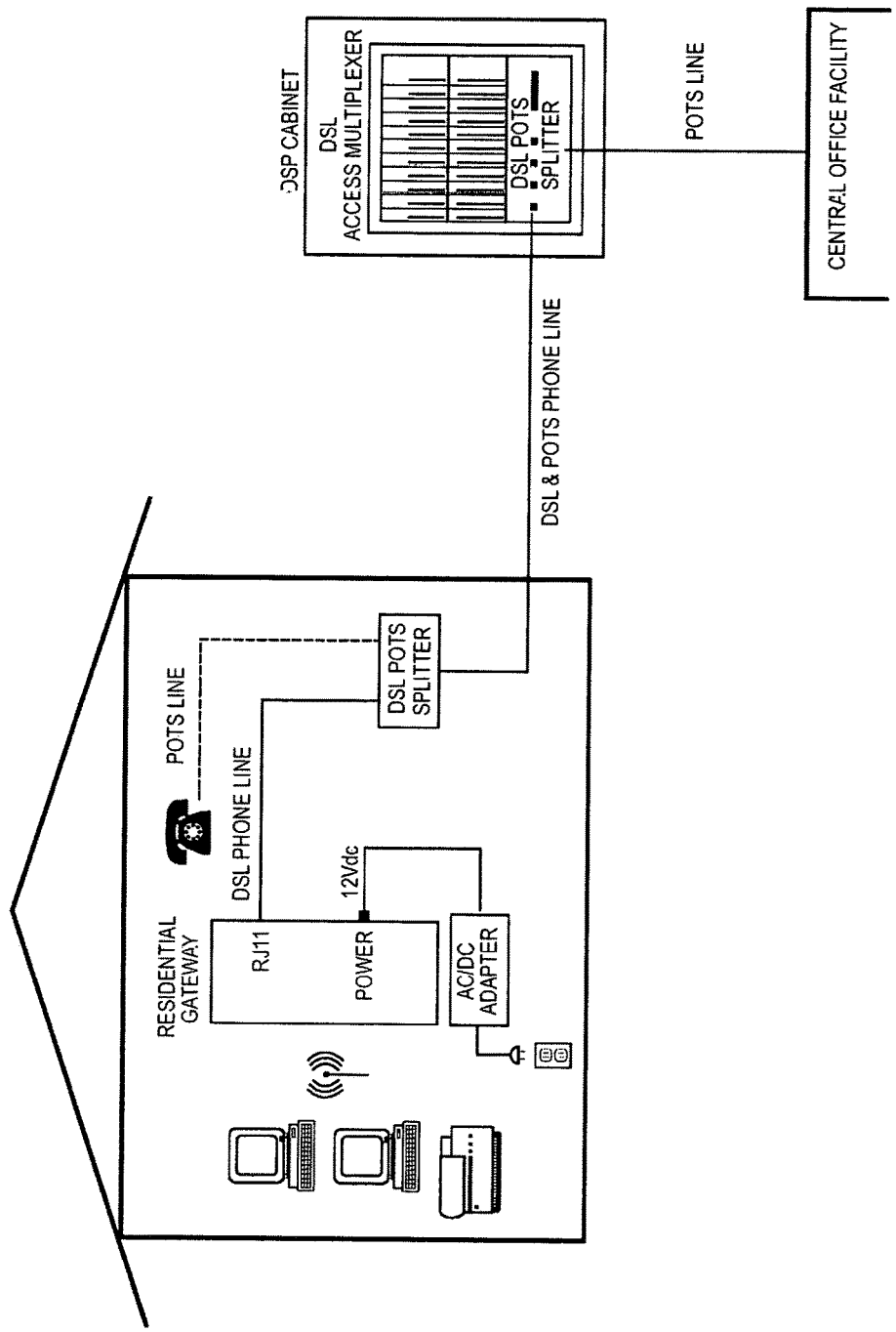
FIG. 1 is a schematic diagram illustrating traditional combined POTS and DSL service.

FIG. 1 is schematic diagram of combined POTS and DSL service delivered by a Central Office to a customer's facility through a DSL OSP equipment cabinet, as is known in the prior art. The current provided by POTS maintains the wire continuity connections by preventing oxidation at wire splices or IDC wire connections between the Service Providers facility (i.e. Central Office and OSP equipment cabinet) and the Customer Premises or residence.

Figure 2:
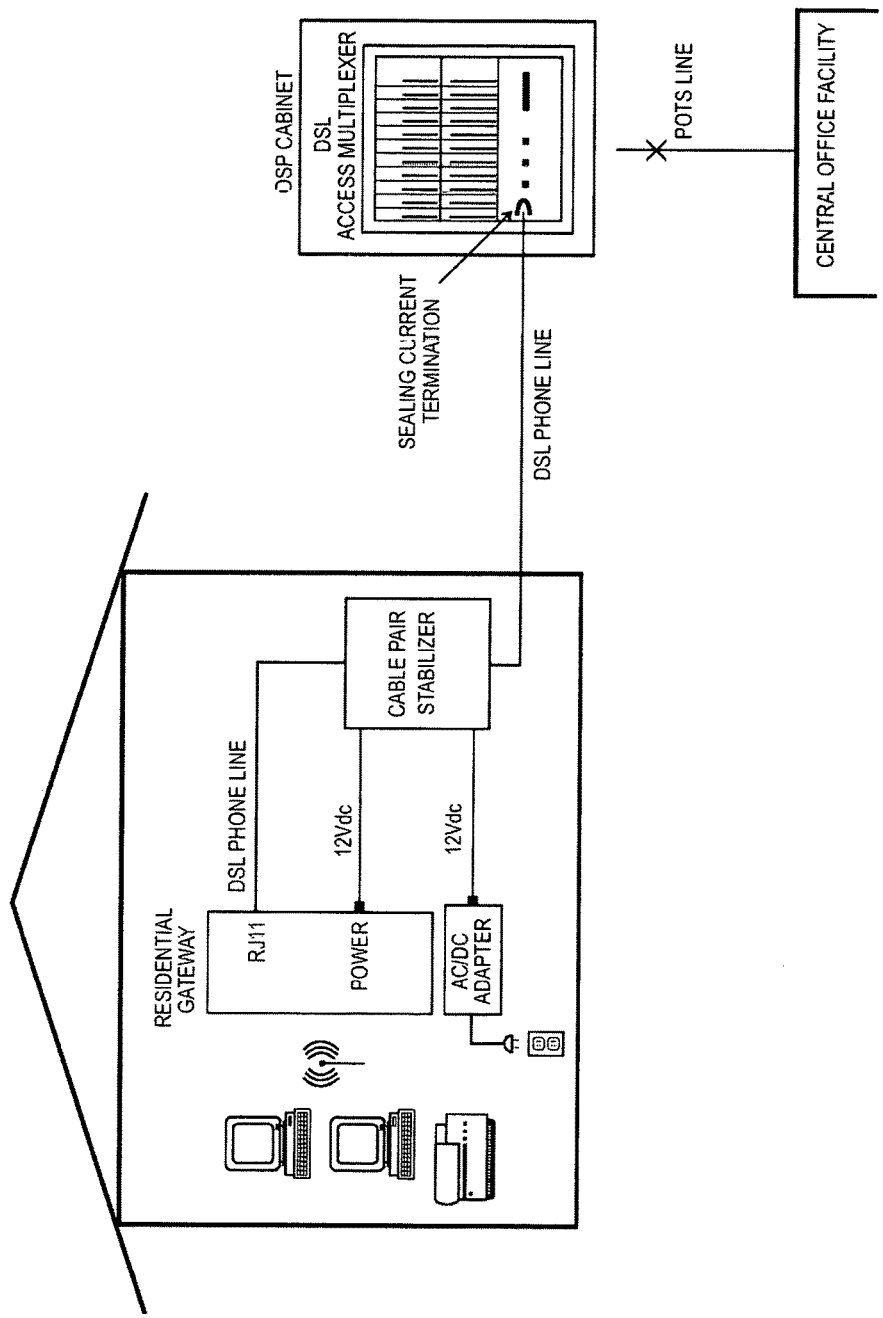
FIG. 2 is a schematic diagram of one embodiment of the method(s) and system(s) of present disclosure.

FIG. 2 is a schematic diagram of a preferred embodiment of the present disclosure, where the POTS is either disconnected, or was not initially deployed. Thus, a DSL only service deployment is illustrated. As such, no current is provided by the POTS to maintain the wire continuity connections and prevent oxidation at wire splices or IDC wire connections. To remedy this situation, a cable pair stabilizer unit is provided and connected, at the Customer's Premises or residence, to the DSL only service. The cable pair stabilizer unit generates and provides a sealing or wetting current from the customer premises into the Service Provider's telephone cables for DSL service.

As can be seen, there are four lines connected or running to or from the cable pair stabilizer unit. The following is a description of each of these four lines (in no order of importance, i.e., the designations first, second, third and fourth are randomly assigned solely for a point of reference or illustration purposes). The first line is an AC/DC power supply adapter, which is connected at one end to the cable pair stabilizer unit to provide power to the unit when it is plugged into an electrical outlet at its other end. The second line is a 12 Vdc power cord or line, which extends from the cable pair stabilizer unit and is connected to the customer's residential gateway or modem, to provide power to the residential gateway/modem from the AC/DC power supply, through the cable pair stabilizer unit. The third line is a DSL phone line, which is connected to the cable pair stabilizer unit at one end, and to the Service Provider's telephone cables for DSL service at the other end, typically by plugging the DSL phone line into a wall jack located at the customer's premises. Finally, the fourth line is a DSL phone line which extends from the cable pair stabilizer unit and is connected to the customer's residential gateway or modem, to provide DSL service to the residential gateway/modem from the wall jack leading to the Service Provider's telephone cables, and through the cable pair stabilizer unit.

Figure 3:
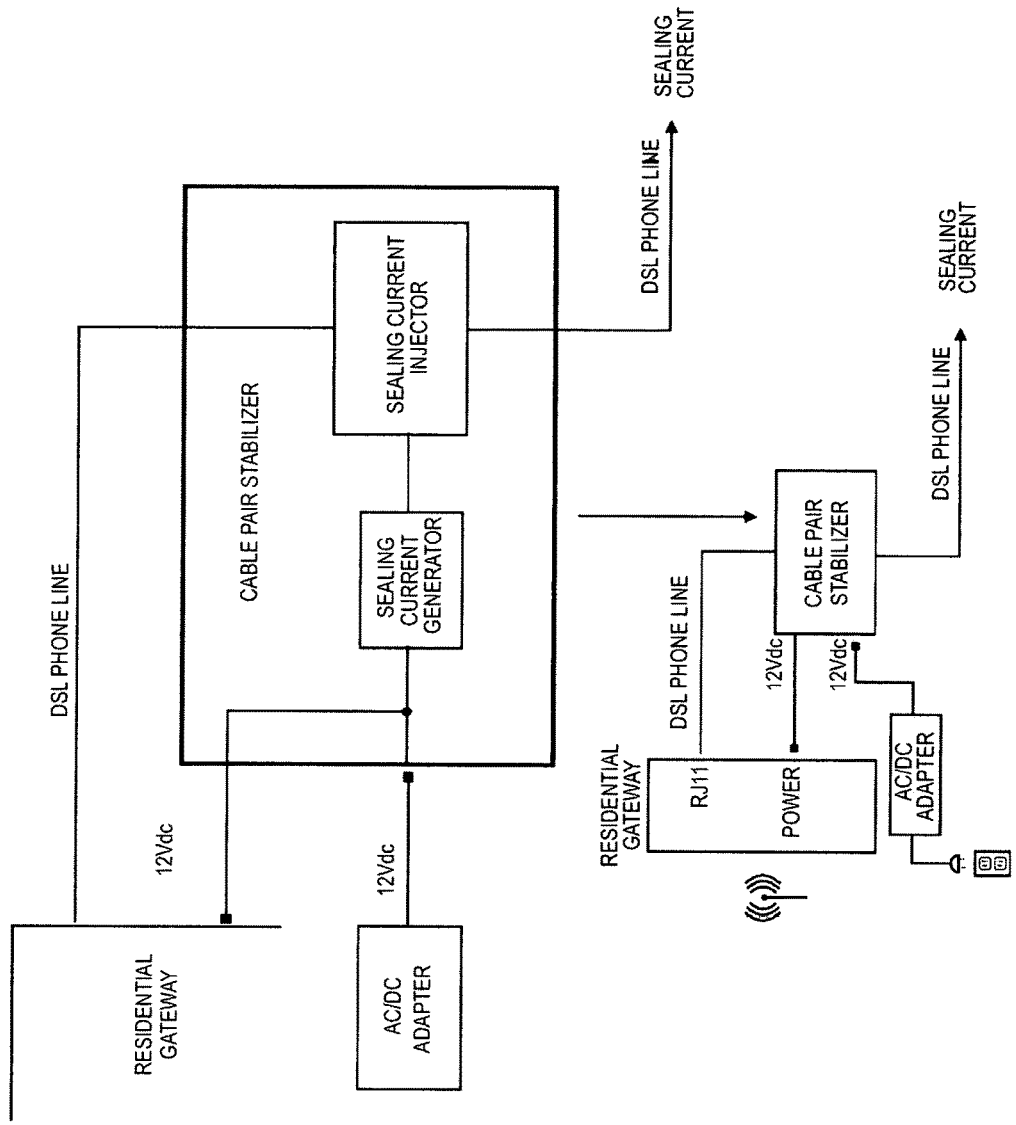
FIG. 3 is an enlarged schematic diagram of the cable pair stabilizer unit of FIG. 2, illustrating its internal components.

FIG. 3 is an enlarged view of cable pair stabilizer unit of FIG. 2 illustrating its internal components. As can be seen in FIG. 3, the cable pair stabilizer unit comprises a sealing current generator or regulator, for generating the sealing current, and a sealing current injector, for injecting the sealing current into the Service Provider's telephone cables for DSL service. The sealing current generator/regulator and the sealing current injector both comprise electrical circuitry, as illustrated in the respective embodiments of FIGS. 8-10, which may be provided on a printed circuit board.

Figure 4:
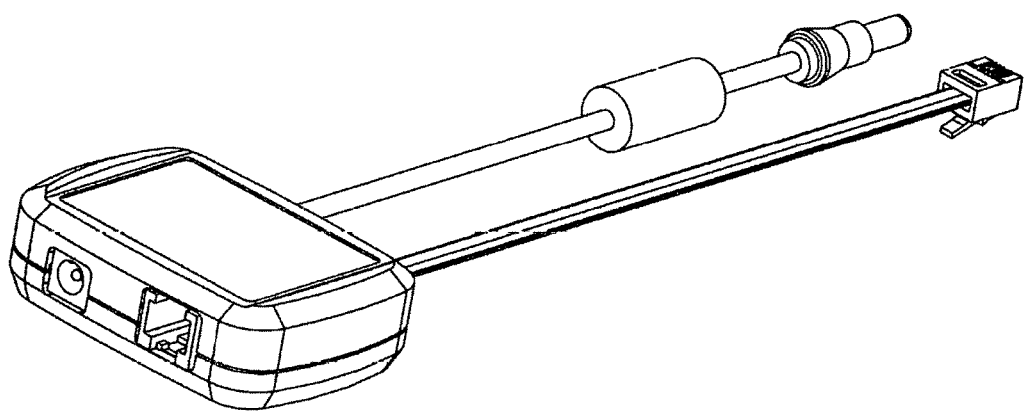
FIG. 4 is a perspective view of the cable pair stabilizer unit of FIG. 2.

FIG. 4 is a perspective view of the cable pair stabilizer unit. As can be seen, the cable pair stabilizer unit comprises a housing, which houses the electrical circuitry for the sealing current generator and the sealing current injector. A 12 Vdc power jack is provided on the housing for connecting the AC/DC power supply adapter (first line), as discussed above with reference to FIG. 2 and illustrated in FIGS. 6 and 7. A DSL phone line jack is also provided on the housing for connecting a DSL phone line (third line), as discussed above with reference to FIG. 2 and illustrated in FIGS. 6 and 7. Additionally, a 12 Vdc power cord or line (second line), extends from the housing for connection with the residential gateway/modem, as discussed above with reference to FIG. 2 and illustrated in FIG. 7. A DSL phone line (fourth line), also extends from the housing for connection with the residential gateway/modem, as discussed above with reference to FIG. 2 and illustrated in FIG. 7. Accordingly, it should be understood that the circuitry inside the cable pair stabilizer unit housing allows both power from the AC/DC power supply adapter, and the DSL service from the DSL phone line, to flow through the cable pair stabilizer unit to the residential gateway/modem, while at the same time generating sealing current and sending the sealing current out through the wall jack and into to the Service Provider's telephone cables.

Figure 5:
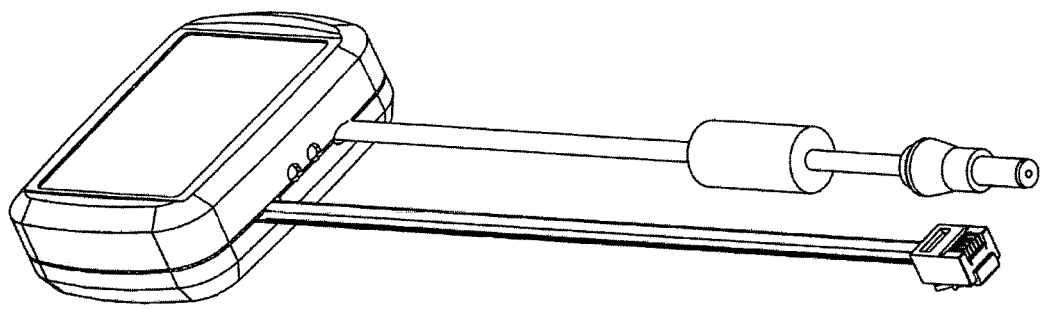
FIG. 5 is an opposite perspective view, from that shown in FIG. 4, of the cable pair stabilizer unit of FIG. 2.
Figure 7:
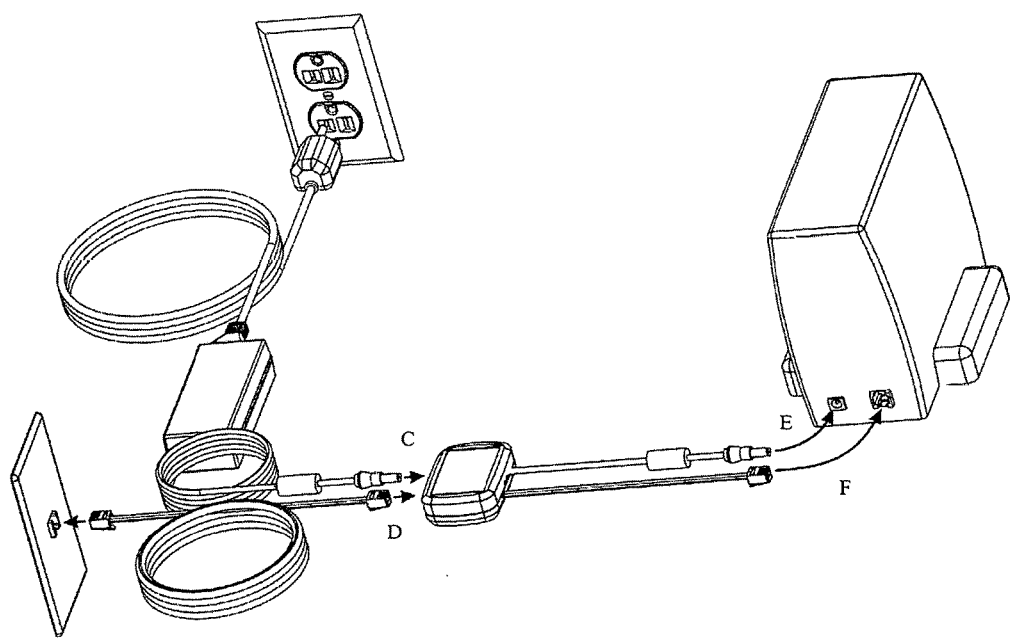
FIG. 7 is a perspective view illustrating the cable pair stabilizer unit of FIGS. 4 and 5 connected into the residential gateway/modem configuration of FIG. 6.

FIG. 5 is an opposite perspective view, from that shown in FIG. 4, of the cable pair stabilizer unit. Again, as illustrated, the housing of cable pair stabilizer unit has two lines extending therefrom, i.e., the 12 Vdc power cord or line (second line), and the DSL phone line (fourth line). As can be seen, the power cord line has a female plug at its free end, which plugs into the residential gateway modem, as shown in FIG. 7. The DSL phone line has a male connector at its free end, which plugs into the residential gateway modem, as shown in FIG. 7. Also provided on the housing of the cable pair stabilizer unit are two indicator lights or LEDs. The light closest to the power cord line is the power indicator light (preferably green). This light will be illuminated when the cable pair stabilizer unit is connected to the power cord (first line) when plugged into a power outlet. The light closest to the DSL phone line is the sealing current indicator light (preferably yellow). This light will be illuminated when the cable pair stabilizer unit is generating and supplying the sealing current to the Service Provider's telephone cables through the DLS phone cord connected to the wall jack.

Figure 8:
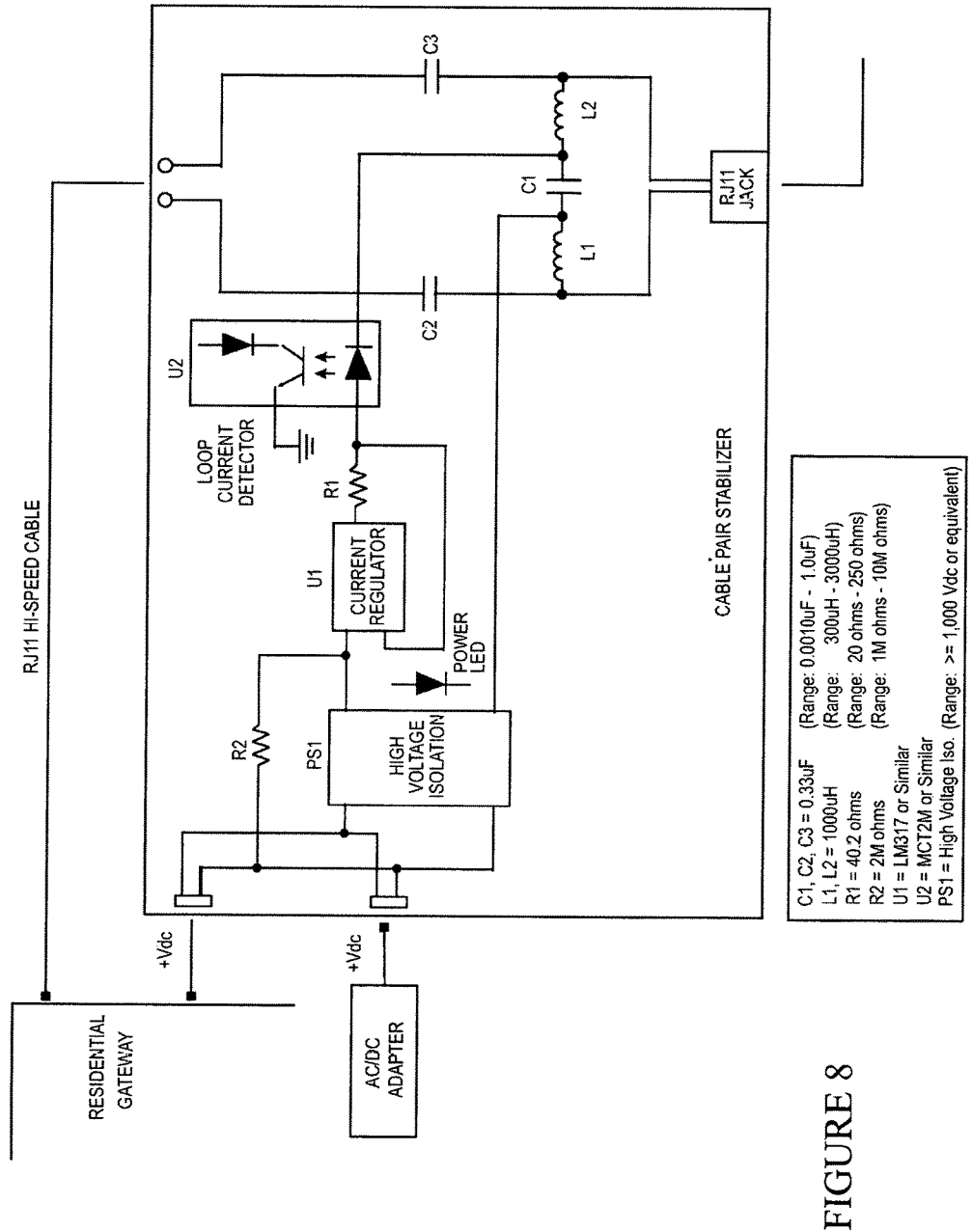
FIG. 8 is a first exemplary circuit diagram of the cable pair stabilizer unit of FIG.
Figure 9:
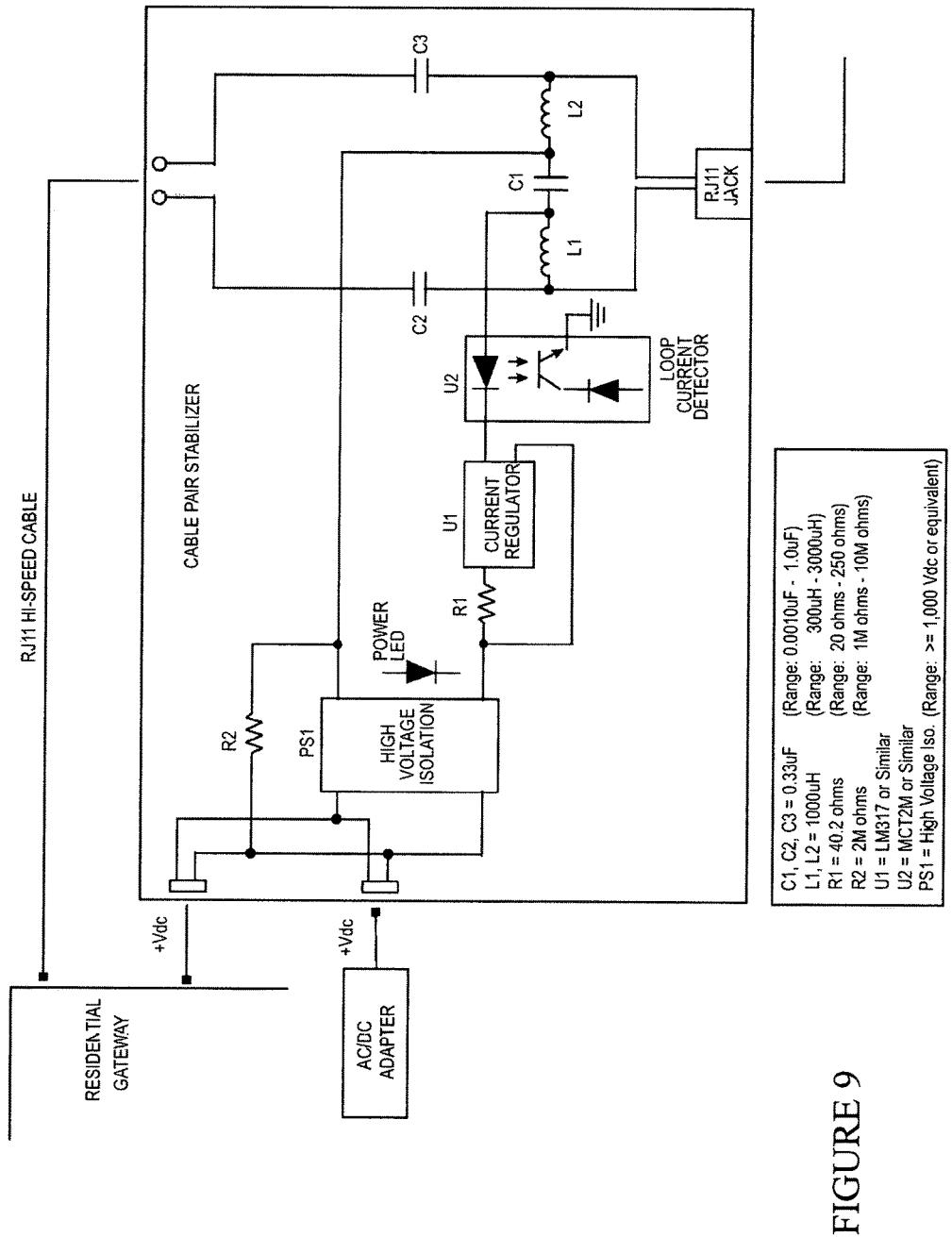
FIG. 9 is a second exemplary circuit diagram of the cable pair stabilizer unit of FIG. 2.

The embodiments illustrated in FIGS. 8 and 9, for DSL service involving one wire pair, will have this illustrated configuration of one power indicator LED and one sealing current indictor LED. The embodiment illustrated in FIG. 10, for DSL service involving two wire pairs, will have an additional sealing current and power indictor LEDs, i.e., four total LEDs, namely two power indictor LEDs and two sealing current indicator LEDs. This is because the cable pair stabilizer unit of the embodiment of FIG. 10 has two current generators, as discussed in more detail below.

Figure 6:
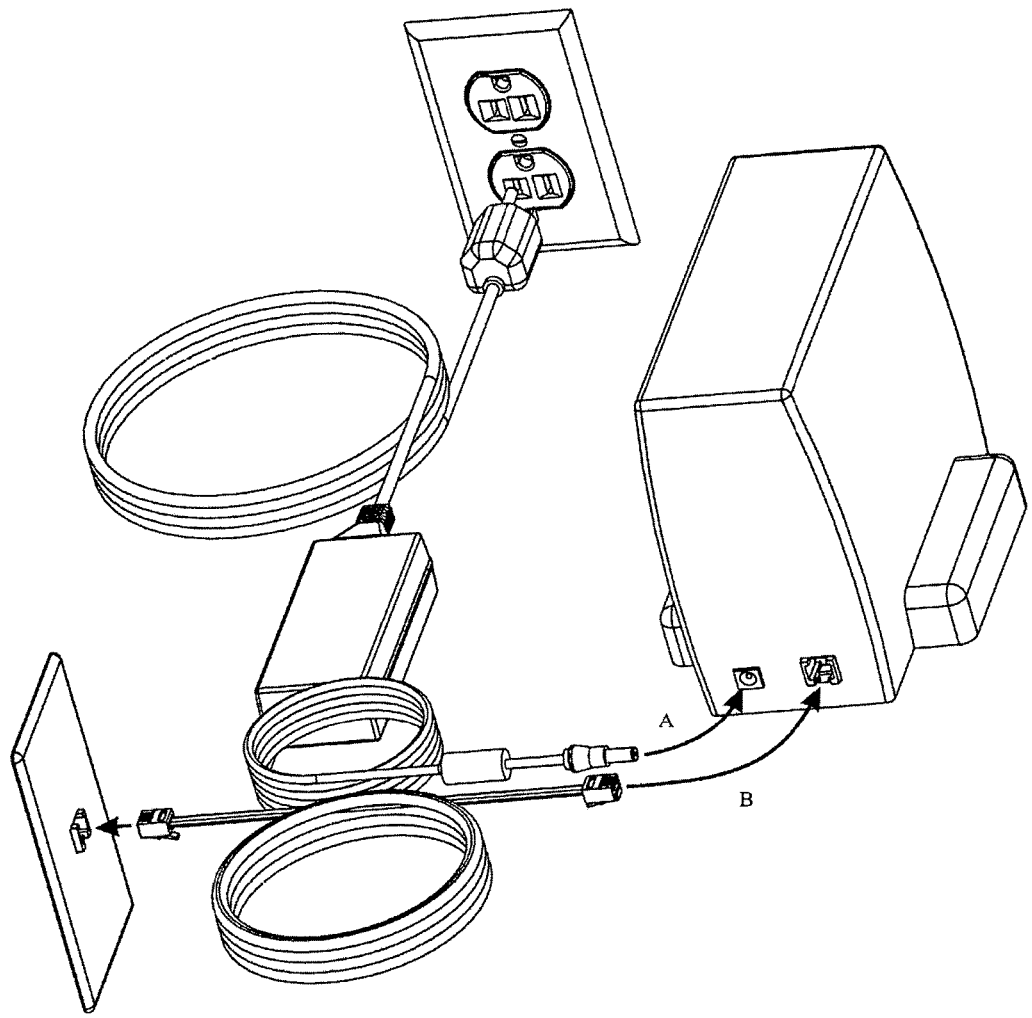
FIG. 6 is a perspective view illustrating a prior art residential gateway/modem configuration.

Referring now to FIGS. 6 and 7, a residential gateway/modem is illustrated. If in use without the cable pair stabilizer unit, as shown in the typical prior art configuration of FIG. 6, the modem's power cord (first line) is plugged into a power outlet, and the female plug at its other free end is connected directly to the residential gateway/modem, as illustrated by the arrow A in FIG. 6. Similarly, the DSL phone line (third line) is connected to a wall jack, and the male connector at its other free end is connected directly to the residential gateway/modem, as illustrated by the arrow B in FIG. 6.

To connect the cable pair stabilizer unit, as illustrated in FIG. 7, the power cord (first line), if connected to the residential gateway/modem, is disconnected and then plugged into the cable pair stabilizer unit, as illustrated by the arrow C in FIG. 7. The DSL phone line (third line), if connected to the residential gateway/modem, is disconnected and then plugged into the cable pair stabilizer unit, as illustrated by the arrow D in FIG. 7. Next, the power cord or line (second line) extending from the housing of the cable pair stabilizer unit is connected to the residential gateway/modem, as illustrated by the arrow E in FIG. 7. Similarly, the DSL phone line (fourth line) extending from the housing of the cable pair stabilizer unit is connected to the residential gateway/modem, as illustrated by the arrow F in FIG. 7.

FIG. 8 illustrates a circuit diagram of the cable pair stabilizer unit, as well as the four lines which are connected to the cable pair stabilizer unit. The DC jack for connection of the AC/DC power supply cord (first line) is illustrated at the left center of the circuit diagram. The power cord line (third line) which extends from the cable pair stabilizer unit housing to the residential gateway is illustrated at the upper left of the circuit diagram. The DSL phone line jack for connection of the DSL phone cord (second line) leading to the service provider's wire pair, is illustrated at the lower right of the circuit diagram. The DSL phone line (fourth line) which extends from the cable pair stabilizer unit housing to the residential gateway is illustrated at the upper right of the circuit diagram.

The High Voltage Isolation circuitry, PSI, is illustrated in FIG. 8 approximately in the left center of the circuit diagram. The High Voltage Isolation circuitry provides 1500V dielectric insulation between the 12 Vdc power jack and the DSL phone line jack. The 1500V dielectric insulation meets the requirement of Underwriter Laboratories UL60950. PSI is preferably a PDS1-S12-S15-S. Another example of a High Voltage Insulation circuitry would be an additional winding(s) on the transformer in the AC/DC power supply adapter, as discussed below with respect to FIG. 11E.

The sealing current generator circuitry, U1, is illustrated in the left center of the circuit diagram. U1 is preferably an LM317 or similar. The loop current detector circuitry, U2, which includes the sealing current indicator LED, is illustrated to the right of the sealing current generator, U1. U2 is preferably an MCT2M or similar. The sealing current injector circuitry, C1-C3 and L1-L2, is illustrated on the right side of the circuit diagram. Ranges for values of this circuitry C1-C3 and L1-L2, along with preferred values, are set forth in the chart pictured below the circuit diagram in FIG. 8. Also illustrated in the circuit diagram are the power indicator LED, and two resistors, R1 and R2, the range values and a preferred value of which are also set forth in the chart pictured below the circuit diagram in FIG. 8.

FIG. 9 illustrates an alternate circuit layout of the components of the cable pair stabilizer unit from that shown in FIG. 8, and in particular with respect to the current regulator/generator and loop current detector. The circuit diagram of FIG. 9 is provided as an alternative embodiment to provide different voltage readability on the RJ11 wire pair. When the service personnel install or troubleshoot the cable pair stabilizer unit, the service personnel would use a digital multimeter to measure the voltage along the Service Provider's telephone cable pair or pairs. The circuit diagram of FIG. 8 would measure approximately −6 Vdc on each wire to ground and 12 Vdc across both wires. The circuit diagram of FIG. 9 would measure approximately −12 Vdc on a wire to ground and the other wire would measure approximately 0 Vdc on a wire to ground. The range values and a preferred value of the circuitry in FIG. 9 are the same as in FIG. 8, as set forth in the chart pictured below the circuit diagram in FIG. 9.

Accordingly, the sealing current generator/regulator taps the 12 Vdc (12 volts DC) power from the residential gateway AC/DC power supply to create the sealing current (greater than 5 mA milliamps DC). The sealing current injector injects or adds the sealing current into the telephone cable without disrupting the DSL service. The sealing current injector only allows the sealing current to flow into the telephone cable going out to Service Provider's network. The sealing current injector blocks the sealing current from entering into the residential gateway/modem by capacitors C2 and C3.

Figure 10:
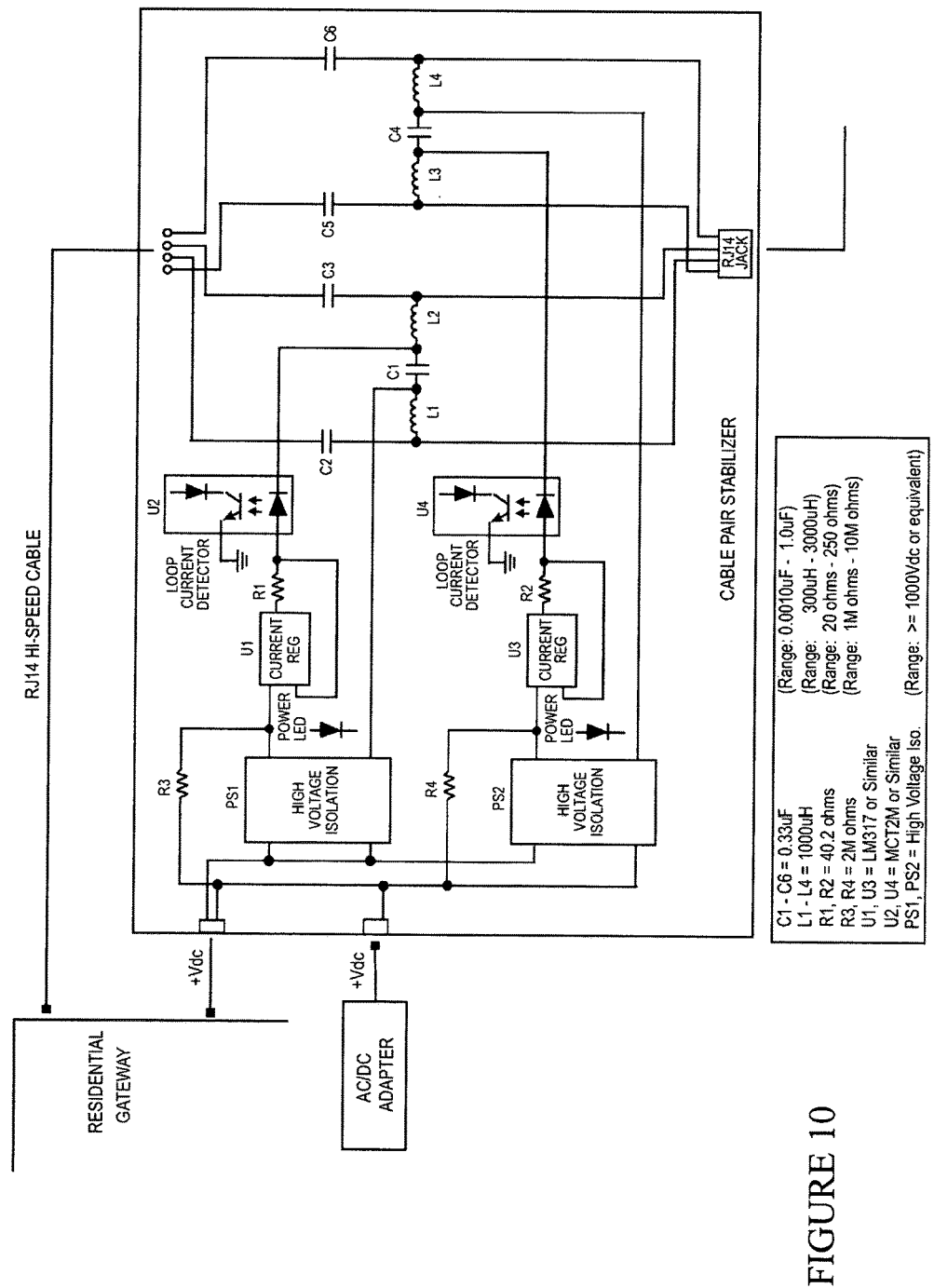
FIG. 10 is a third exemplary circuit diagram of the cable pair stabilizer unit of FIG. 2.
Figure 12A:
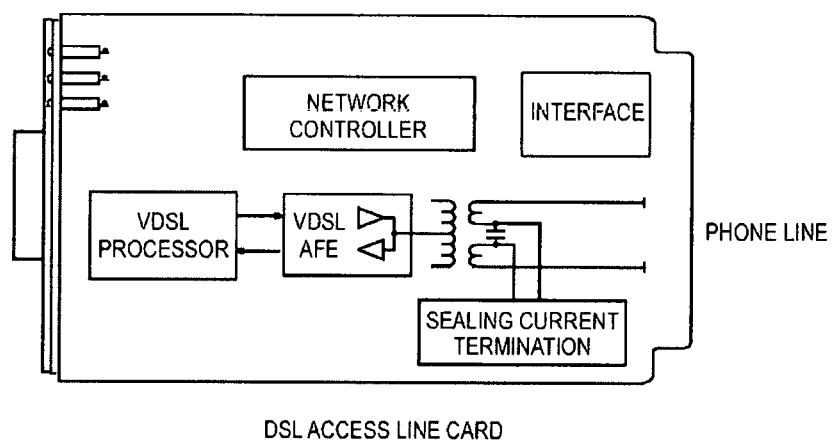
FIG. 12A is a schematic view of sealing current termination circuitry incorporated into a DSL Access Line Card.
Figure 12B:
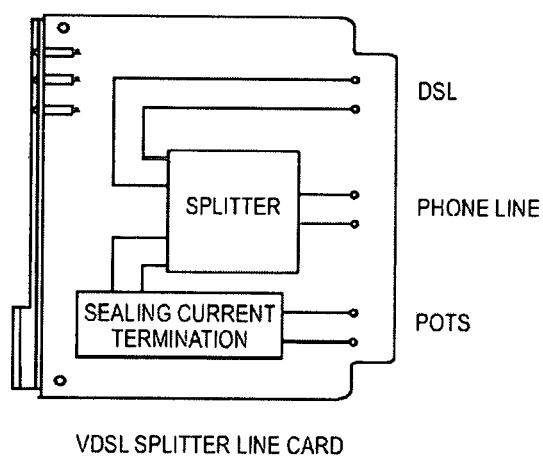
FIG. 12B is a schematic view of sealing current termination circuitry incorporated into a DSL Splitter Line Card.

Since the POTS line is either disconnected or not installed, the DSL cable pair(s) require a "sealing current termination" (see FIG. 2) to close or complete the sealing current loop. This "sealing current termination" is typically performed by equipment located at the OSP cabinet or other locations where the DSL cables pair(s) can be appropriately accessed to implement the sealing current termination. For example, the "sealing current termination" can be accomplished using a "wire short" on IDC connectors, by various DC current termination circuitry, such as an electronic inductor. Alternatively, the sealing current termination circuitry can be implemented on a DSL Access Line Card or DSL Splitter Line Card as illustrated in FIG. 12A and FIG. 12B, respectively. FIG. 10 is a circuit diagram of the cable pair stabilizer circuit for two pairs or a 4-wire DSL service. As can be seen, the circuit design for the 4-wire DSL service requires an additional sealing current generator, U3 (LM317), an additional loop current detector, U4 (MCT2M), and an additional sealing current injector, C4-C6 and L3-L4, to ensure noise and transient isolation between the two (2) telephone pairs. The cable stabilizer design for 4-wire applications uses the same general concepts of the sealing current generator/regulator and injector as described above with respect to the single pair DSL service. The generators and injectors will have the same functionality, but the design differs as shown due to the 4-wires. The sealing current injectors only allow the sealing current to flow into the telephone cables going out to Service Provider's network. The sealing current injectors block the sealing current from entering into the residential gateway/modem by capacitors C2 and C3, and capacitors C5 and C6, respectively. The range values and a preferred value of the circuitry in FIG. 10 are set forth in the chart pictured below the circuit diagram in FIG. 10.

In FIGS. 8-10, the flow of current starts from the power supply, goes through the cable pair stabilizer unit, into the DSL service loop of the Service Provider's telephone cables, and then back through the cable pair stabilizer unit to complete the loop. Accordingly, current flows from the power supply and into the sealing current generator circuitry where the sealing current is generated. The sealing current then flows into the sealing current injector circuitry where it is sent to the Service Provider's telephone lines, and shorted, for example, at the DSL OSP equipment cabinet. The sealing current loops around the Service Provider's telephone lines and is returned to the cable pair stabilizer unit, where it flows back to the power supply jack to complete the circuit.

FIGS. 11B-11F illustrate an alternate embodiment of the present disclosure, wherein the cable pair stabilizer unit is integrated with an AC/DC power supply adapter. Accordingly, instead of having to use a separate cable pair stabilizer unit, as shown in FIGS. 4, 5 and 7, and a separate AC/DC power supply adapter, as shown in FIGS. 7 and 11A, a single, integrated device comprising a combined cable pair stabilizer unit and AC/DC power supply adapter in a single housing, as shown in FIGS. 11B-11F, is used. As can be seen in FIGS. 11B-11F, this integrated device has, in addition to a standard AC power cord connector and DC power cord, an RJ11/RJ14 jack for connecting a DSL phone line, and an RJ11/RJ14 cable assembly (FIG. 11B) or an RJ11/RJ14 jack (FIG. 11C) for connecting to the residential gateway/modem. It should be understood that all cable assemblies, whether for power or phone line, can be either integrated, or alternatively attached via a jack.

Figure 11A:
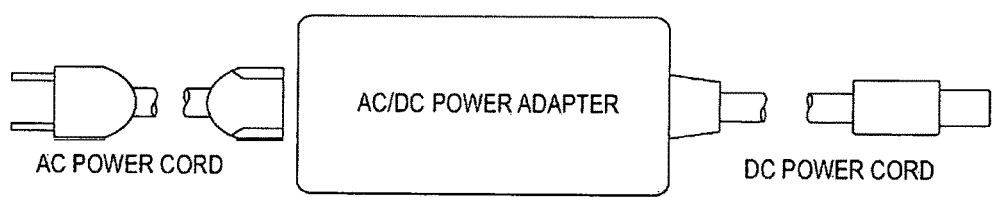
FIG. 11A is a schematic view of a typical prior art AC/DC power supply adapter.
Figure 11D:
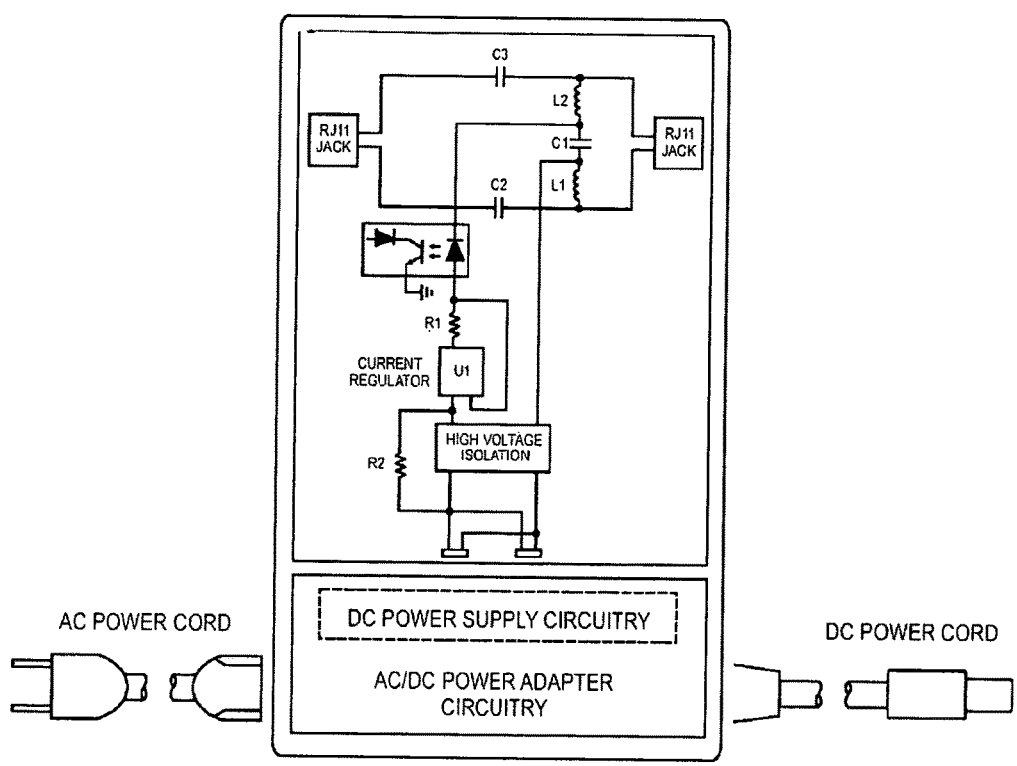
FIG. 11D is a detailed schematic view of the integrated cable pair stabilizer unit and AC/DC power supply adapter of FIG. 11C, illustrating an exemplary circuit diagram for the same.
Figure 11E:
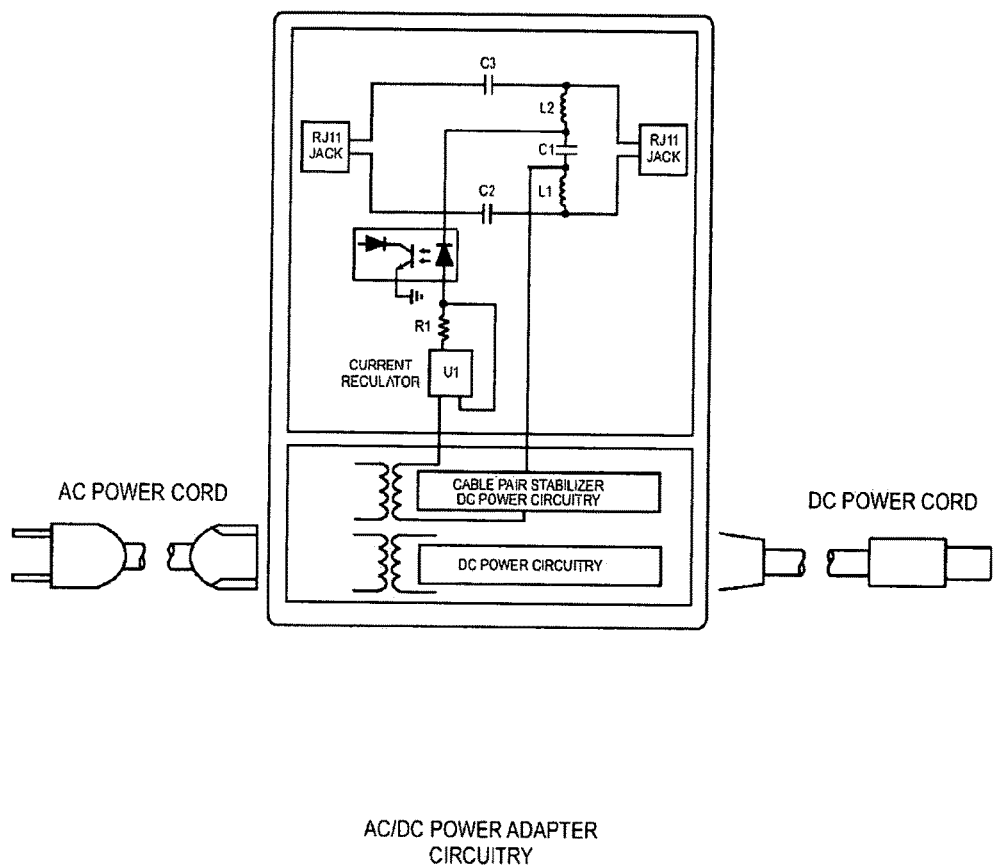
FIG. 11E is a detailed schematic view of the integrated cable pair stabilizer unit and AC/DC power supply adapter of FIG. 11C, illustrating and alternate circuit diagram using a High Voltage Isolation circuitry of the AC/DC power supply adapter.
Figure 11F:
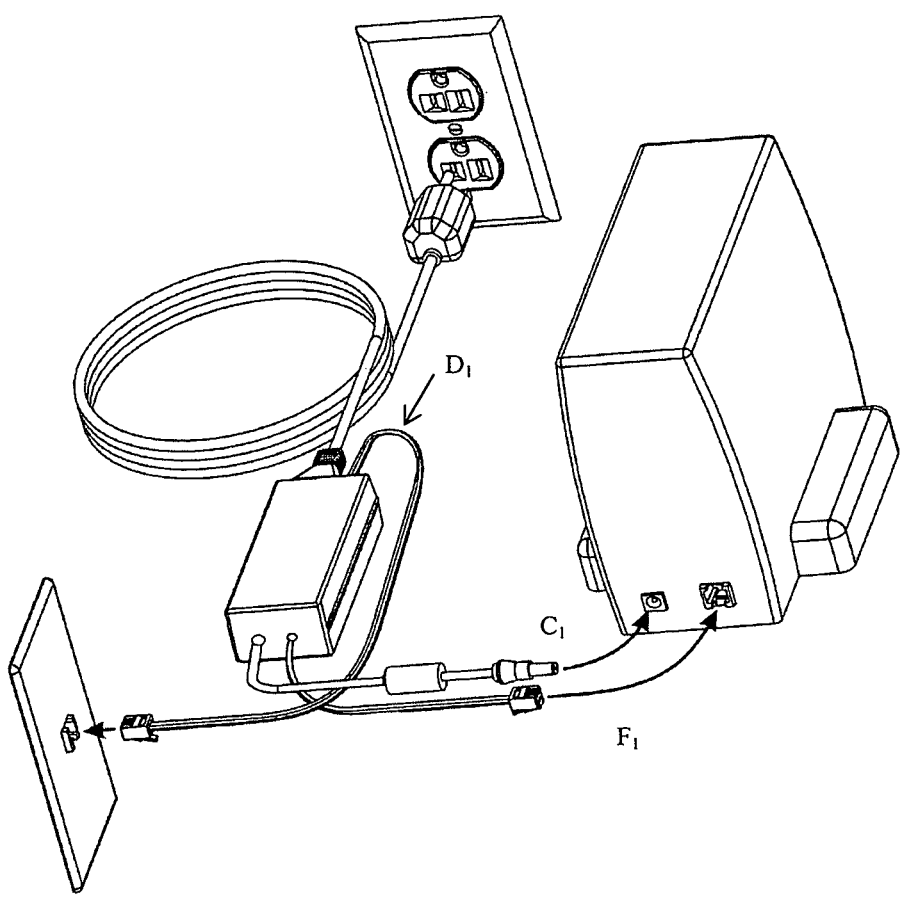
FIG. 11F is a perspective view illustrating the integrated cable pair stabilizer unit and AC/DC power supply adapter of FIG. 11B connected with a residential gateway/modem.

As illustrated in FIG. 11F, the integrated device is connected to the residential gateway/modem as follows. If a standard AC/DC power supply adapter is connected to the residential gateway/modem, it is unplugged and not used. The integrated device's DC power cord is instead plugged directly into the residential gateway/modem, as illustrated by the arrow $C_1$ in FIG. 11F. The DSL phone line, if connected to the residential gateway/modem, is disconnected and then plugged into the RJ11/RJ14 jack of the integrated device, as illustrated by the arrow Di in FIG. 11F. Similarly, the RJ11/RJ14 cable assembly extending from the housing of the integrated device is connected to the residential gateway/modem, as illustrated by the arrow $F_1$ in FIG. 11F.

The integrated device functions in the same manner as the separate cable pair stabilizer unit and includes the cable pair stabilizer circuitry as shown for example in one of the FIGS. 8-10. For example, the integrated device of FIG. 11D is shown incorporating the circuitry of FIG. 8. Alternatively, FIG. 11E illustrates an integrated cable pair stabilizer unit and AC/DC power supply adapter using an additional winding(s) to provide a high voltage isolation and voltage for the sealing current generator. In either embodiment, current flows from the power supply and into the sealing current generator circuitry within the integrated device, and the sealing current is generated. The sealing current then flows into the sealing current injector circuitry within the integrated device, where it is sent to the Service Provider's telephone lines, and shorted, for example, at the DSL OSP equipment cabinet. The sealing current loops around the Service Provider's telephone lines and is returned to the integrated device, where it flows back to the power supply jack to complete the circuit.

The integrated device can have circuitry for one wire pair or two wire pairs in the manner discussed above. For DSL service involving one wire pair, the integrated device will have the configuration of one power indicator LED and one sealing current indictor LED for a single current regulator or generator. For DSL service involving two wire pairs, the integrated device will have an additional sealing current indictor LED, i.e., three total LEDs, namely one power indictor LED and two sealing current indicator LEDs, one for each of the two current regulators or generators.

Figure 14:
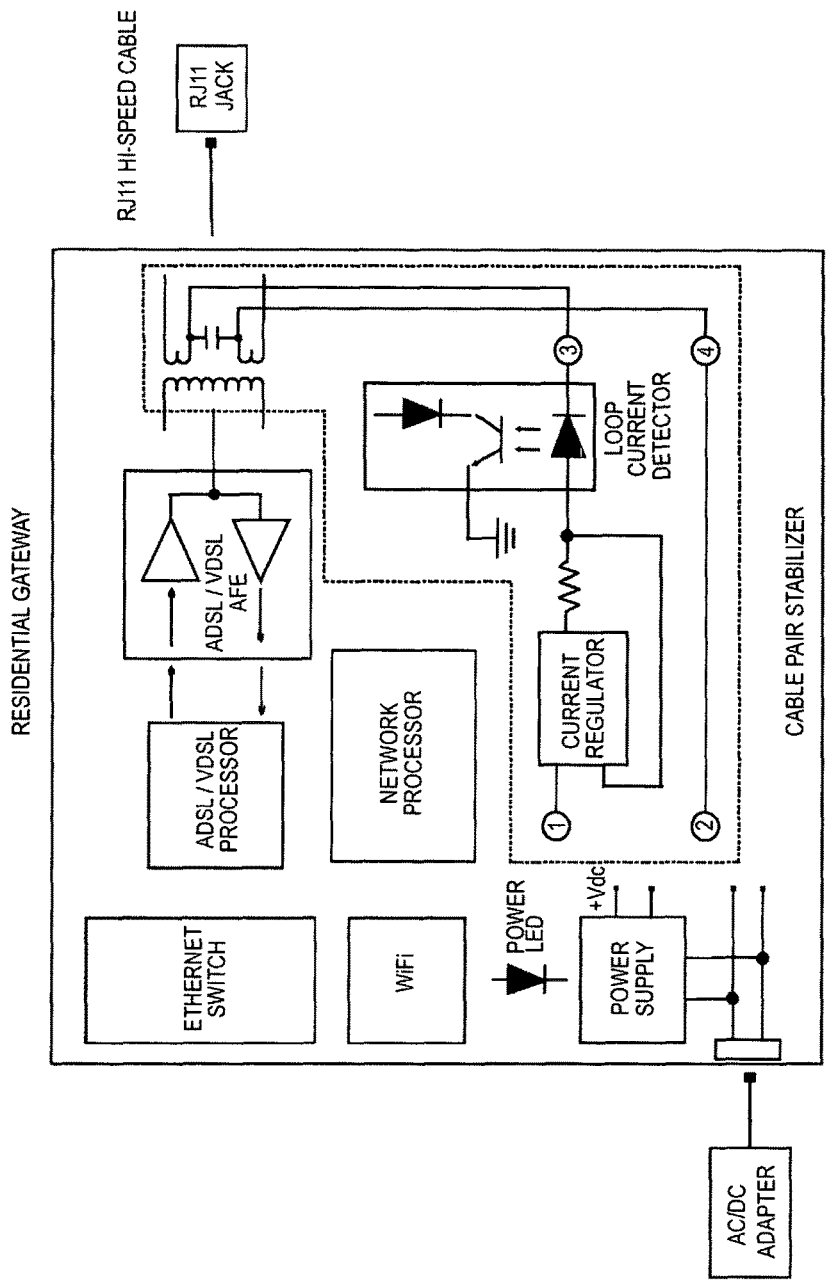
FIG. 14 is a schematic view of an alternate embodiment of the present disclosure illustrating an integrated cable pair stabilizer unit and Residential Gateway.

FIG. 14 illustrates an alternate embodiment of the present disclosure, wherein the cable pair stabilizer unit is integrated within a Residential Gateway. Accordingly, instead of having to use a separate cable pair stabilizer unit, as shown in FIGS. 4, 5 and 7, or an integrated cable pair stabilizer unit and AC/DC power adapter, as shown in FIGS. 11B-11F, a single, integrated device comprising a combined cable pair stabilizer unit and Residential Gateway is shown in FIG. 14. As can be seen in the circuit diagram of FIG. 14, the cable pair stabilizer circuitry, shown within the dotted outline, is integrated with the components of the Residential Gateway, inside of the Residential Gateway. The integrated cable pair stabilizer circuitry and Residential Gateway will resemble from the exterior a traditional Residential Gateway and will connect in the same manner as a traditional Residential Gateway, as illustrated in FIG. 6. However, because the integrated Residential Gateway incorporates the cable pair stabilizer circuitry within the housing of the Residential Gateway, the desired sealing current is generated and provided from the customer premises into the Service Provider's telephone cables for DSL service, functioning in the same manner as the separate cable pair stabilizer unit.

In the above described manner, the cable pair stabilizer unit and/or the integrated devices each have the ability to tap and generate sealing current using the residential gateway or modem power source. The sealing current is generated at the Customer's Premises and provides the required prevention of oxidation or corrosion at telephone cable wire splices or IDC wire connections from the Customer's Premises at a relatively low cost, thereby overcoming the disadvantages and limitations, including high costs, limited space, limited power, and thermal challenges associated with generating sealing current from within the Service Provider's facility or outside plant (OSP) equipment cabinet.

In an exemplary embodiment, the cable pair stabilizer unit shown in FIGS. 4, 5 and 7, is approximately 2.74 inches in length, 1.97 inches in width, and 0.83 inches in height. The housing of the unit is comprised of ABS plastic, 94 V0 Rated. The output voltage/current is −12 Vdc @ 30 mA±5 mA, or −15 Vdc @ 30 mA±5 mA. The input voltage/current is −12 Vdc @ 40 mA±5 mA (DC-DC Converter Efficiency), or −15 Vdc @40 mA±5 mA (DC-DC Converter Efficiency). Signal interoperability is ADSL, ADSL+. VDSL, VDSL2 compatible. Insertion loss is <0.2 dB (100 kHz-30 MHz). Wire connectors are 24 Gauge Twisted Pair Wire—12 inches. Regulatory compliance includes UL60950 and FCC Part 15 Class B. Operating temperature is −10° C. to +50° C.

Figure 13A:
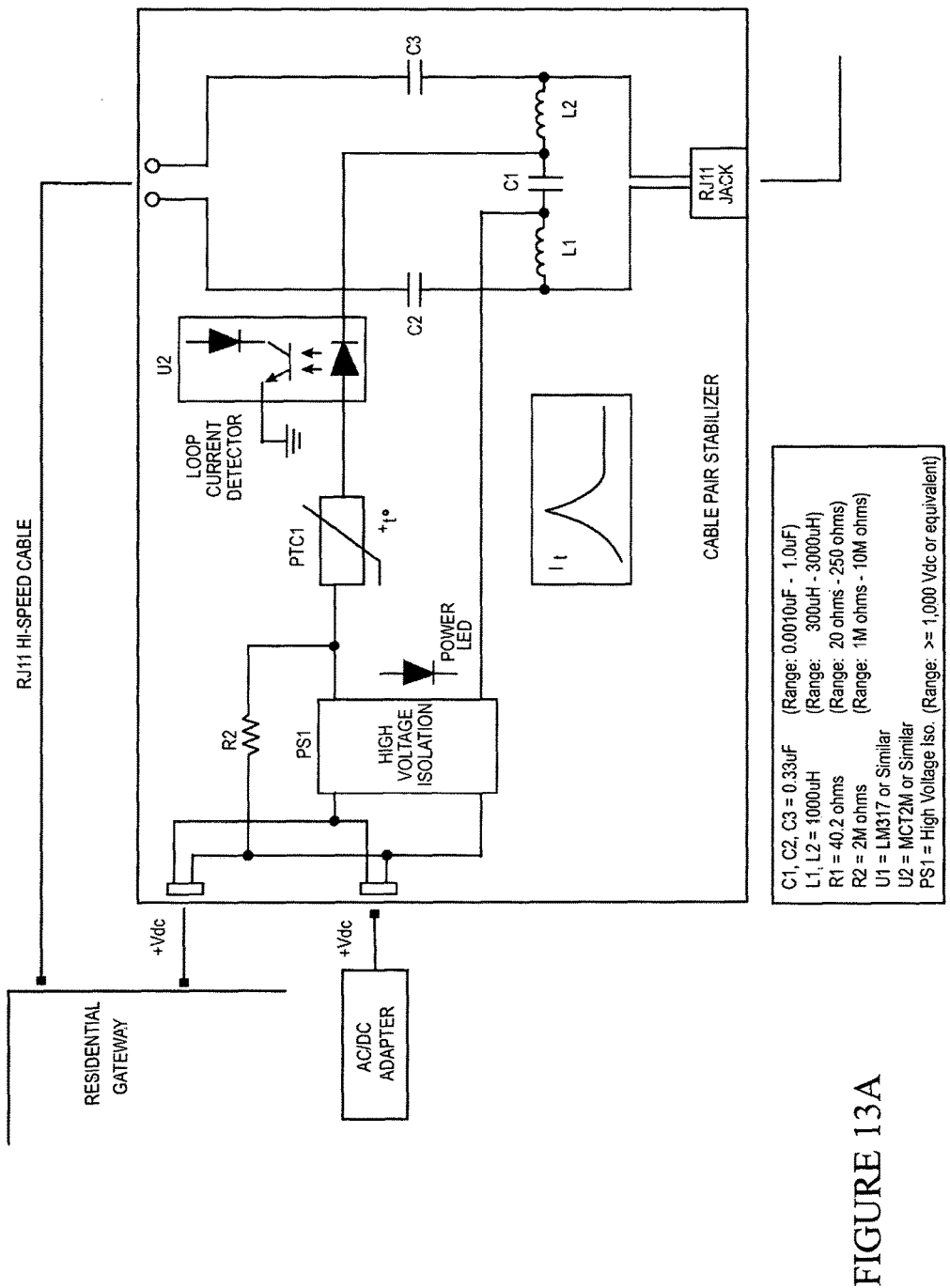
FIG. 13A is a schematic view of an alternate embodiment of the sealing current generator using a Positive Temperature Coefficient (PTC) device.
Figure 13B:
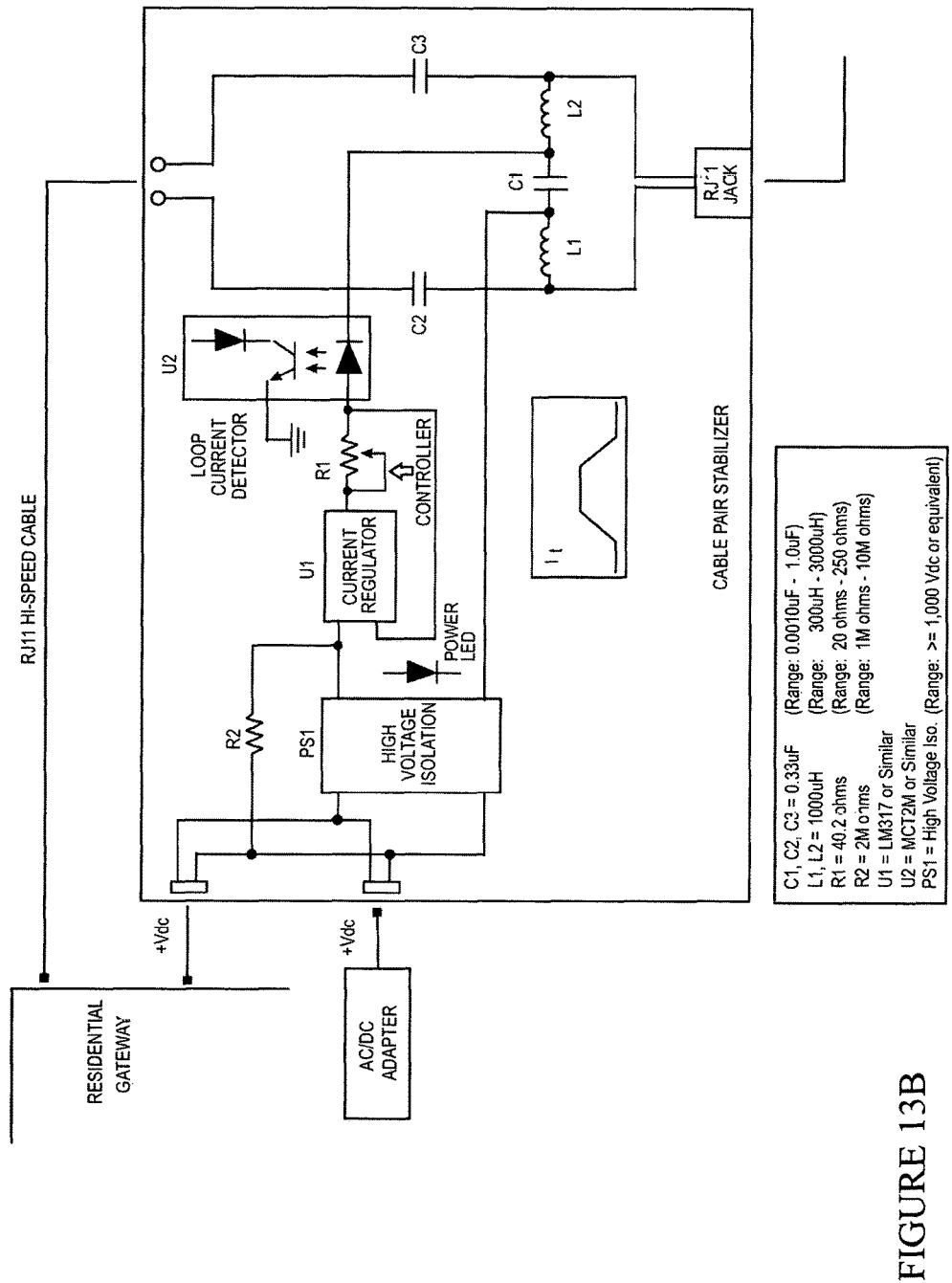
FIG. 13B is a schematic view of an alternate embodiment of the sealing current generator using a Potentiometer and a Controller device.
Figure 13D:
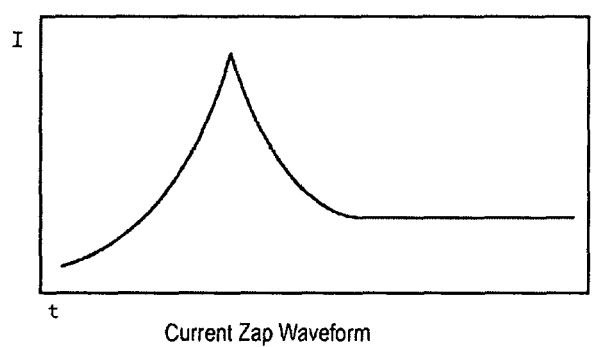
FIG. 13D is a schematic view of the alternate embodiment sealing current generator waveform of the Potentiometer device of FIG. 13B.
Figure 13D:
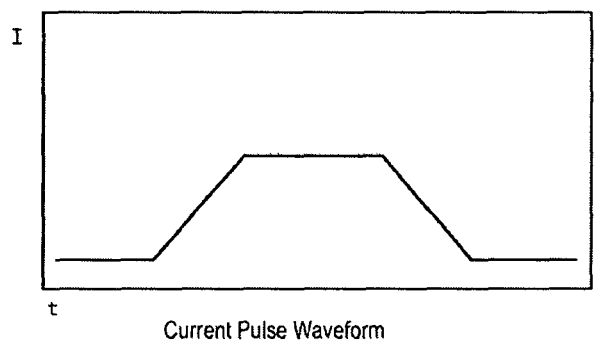

While the embodiment(s) disclosed herein are illustrative of the structure, function and operation of the exemplary method(s), system(s) and device(s), it should be understood that various modifications may be made thereto with departing from the teachings herein. Further, the components of the method(s), system(s) and device(s) disclosed herein can take any suitable form, including any suitable hardware, circuitry or other components capable of adequately performing their respective intended functions, as may be known in the art. For example, the sealing current generator can be implemented with a Positive Temperature Coefficient (PTC) device to provide a surge current ("current zap") as illustrated in FIG. 13A. The sealing current generator can be implement using potentiometer type component and a controller, e.g., with a Potentiometer and Controller to produce a "current pulse" as illustrated in FIG. 13B. The current waveforms for the "current sap" and "current pulse" are illustrated in FIGS. 13C and 13D respectively.

While the foregoing discussion presents the teachings in an exemplary fashion with respect to the disclosed method(s), system(s) and device(s) for generating sealing current from the customer premises or residence, it will be apparent to those skilled in the art that the present disclosure may apply to other method(s) and system(s) for generating and injecting sealing current into a Service Provider's telephone lines for DSL only or other dry or non-powered broadband service. Further, while the foregoing has described what are considered to be the best mode and/or other examples, it is understood that various modifications may be made therein and that the subject matter disclosed herein may be implemented in various forms and examples, and that the method(s), system(s) and device(s) may be applied in numerous applications, only some of which have been described herein.

What is claimed is:

1. A system for generating sealing current and for injecting sealing current into a service provider's telephone cables transporting DSL services between existing service provider equipment and existing customer premises equipment, and for injecting the sealing current from a customer's premises or residence having the existing customer premises equipment including a residential gateway or modem, the system comprising in combination with the existing customer premises equipment and the existing service provider equipment:
    a sealing current device having a housing and at least one connector for connecting the device to the existing customer premises equipment at the customer's premises;
    circuitry in the sealing current device for generating the sealing current;
    circuitry in the sealing current device for injecting the sealing current from the customer's premises into the telephone cables; and
    a short circuit provided on the existing service provider equipment.

2. The device of claim 1, wherein the at least one connector comprises at least one connection for connecting the device between the telephone cables and the residential gateway or modem at the customer's premises.

3. The device of claim 2, further comprising at least one connection for connecting the device between a power supply and the residential gateway or modem at the customer's premises.

4. The device of claim 2, wherein the at least one connection for connecting the device between the telephone cables and the residential gateway or modem at the customer's premises is an RJ11 or RJ14 connection.

5. The device of claim 2, wherein the at least one connection for connecting the device between the telephone cables and the residential gateway or modem at the customer's premises is an RJ11 cable assembly.

6. The device of claim 3, wherein the at least one connection for connecting the device between a power supply and the residential gateway or modem at the customer's premises is a DC power supply connector.

7. The device of claim 3, wherein the at least one connection for connecting the device between a power supply and the residential gateway or modem at the customer's premises is a DC power cord.

8. The device of claim 1, further comprising an indicator on the device for indicating when the device is powered.

9. The device of claim 1, further comprising an indicator on the device for indicating when the device is generating current.

10. The device of claim 8, further comprising an additional indicator on the device for indicating when the device is generating current.

11. The system of claim 1, wherein the existing service provider equipment includes a DSL OSP equipment cabinet having a DSL Access Line Card or DSL Splitter Line Card, and wherein the short circuit is provided in the DSL OSP equipment cabinet.

12. A cable pair stabilizer system for a service provider's telephone cables transporting DSL services between existing service provider equipment and customer premises equipment, and for generating and injecting sealing current from the customer's premises or residence having a residential gateway or modem, the system comprising in combination with the customer premises equipment and the existing service provider equipment:
   a sealing current device at the customer's premises;
   an AC/DC power supply adapter in or connected to the device;
   sealing current circuitry in the device;
   at least one connector for connecting the device between the telephone cables and the residential gateway or modem at the customer's premises;
   wherein the sealing current circuitry generates sealing current and injects the sealing current from the customer's premises into the service provider's telephone cables transporting DSL services; and
   a short circuit provided on the existing service provider equipment.

13. The device of claim 12, further comprising at least one connector for connecting the device between a power supply and the residential gateway or modem at the customer's premises.

14. The device of claim 12, wherein the at least one connector for connecting the device between the telephone cables and the residential gateway or modem at the customer's premises is an RJ11 jack.

15. The device of claim 12, wherein the at least one connector for connecting the device between the telephone cables and the residential gateway or modem at the customer's premises is an RJ11 cable assembly.

16. The device of claim 13, wherein the at least one connector for connecting the device between a power supply and the residential gateway or modem at the customer's premises is an AC power supply connector.

17. The device of claim 13, wherein the at least one connector for connecting the device between a power supply and the residential gateway or modem at the customer's premises is a DC power cord.

18. The device of claim 12, further comprising an indicator on the device for indicating when the device is powered.

19. The device of claim 12, further comprising at least one indicator on the device for indicating when the device is generating current.

20. The device of claim 12, further comprising at least one indicator on the device for indicating when the device is generating pulsed current.

21. A cable pair stabilizer system for a service provider's telephone cables transporting DSL services between existing service provider equipment and customer premises equipment, and for generating and injecting sealing current from the customer's premises or residence, the system comprising in combination with the customer Premises equipment and the existing service provider equipment:
   a residential gateway or modem having a housing;
   sealing current circuitry in or connected to the housing;
   wherein the sealing current circuitry generates sealing current and injects the sealing current from the customer's premises into the service provider's telephone cables transporting DSL services; and
   a short circuit provided on the existing service provider equipment.

22. A method of generating sealing current for a service provider's telephone lines transporting DSL services between existing service provider equipment and customer premises equipment, comprising the steps of:
   providing a sealing current generating device at a customer's premises or residence;
   injecting the sealing current from the customer's premises into the telephone lines; and
   providing a short circuit on the existing service provider equipment.

23. The method of claim 22, wherein the step of providing a short circuit comprises the step of implementing the short circuit in a DSL OSP equipment cabinet having a DSL Access Line Card or DSL Splitter Line Card.

* * * * *